United States Patent
Yang

(10) Patent No.: US 12,335,184 B2
(45) Date of Patent: Jun. 17, 2025

(54) BEAM INDICATION METHOD AND APPARATUS, DEVICE, AND MEDIUM

(71) Applicant: VIVO MOBILE COMMUNICATION CO., LTD., Guangdong (CN)

(72) Inventor: Yu Yang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 18/424,955

(22) Filed: Jan. 29, 2024

(65) Prior Publication Data

US 2024/0171336 A1    May 23, 2024

Related U.S. Application Data

(63) Continuation of application No. 17/875,289, filed on Jul. 27, 2022, now Pat. No. 11,924,131, which is a (Continued)

(30) Foreign Application Priority Data

Feb. 7, 2020  (CN) .......................... 202010082875.6

(51) Int. Cl.
  *H04L 5/00* (2006.01)
  *H04B 7/06* (2006.01)
  *H04W 72/044* (2023.01)

(52) U.S. Cl.
  CPC ......... *H04L 5/0048* (2013.01); *H04B 7/0626* (2013.01); *H04B 7/0639* (2013.01); *H04L 5/0076* (2013.01); *H04W 72/046* (2013.01)

(58) Field of Classification Search
  CPC ... H04L 5/0048; H04L 5/0076; H04B 7/0626; H04B 7/0639; H04W 72/046
  See application file for complete search history.

(56) References Cited

U.S. PATENT DOCUMENTS

| | | | |
|---|---|---|---|
| 2018/0048375 A1* | 2/2018 | Guo | ........................ H04B 7/024 |
| 2018/0331805 A1 | 11/2018 | Xia et al. | |

(Continued)

FOREIGN PATENT DOCUMENTS

| | | |
|---|---|---|
| CN | 109792620 A | 5/2019 |
| CN | 109792745 A | 5/2019 |

(Continued)

OTHER PUBLICATIONS

First Office Action for Korean Application No. 10-2022-7030851, dated Aug. 13, 2023, 3 Pages.

(Continued)

*Primary Examiner* — Jaison Joseph
(74) *Attorney, Agent, or Firm* — BROOKS KUSHMAN P.C.

(57) ABSTRACT

A beam indication method and apparatus, a device, and a medium. The method includes: receiving beam indication information transmitted by a network-side device, where the beam indication information is used to indicate a plurality of pieces of beam information of a channel or a reference signal, and the plurality of pieces of beam information correspond to different transmission and reception point TRP identification information; and transmitting the channel or the reference signal according to the beam indication information.

20 Claims, 3 Drawing Sheets

```
S101 — Receive beam indication information transmitted by a network-side device S102 — Transmit a channel or a reference signal according to the beam indication information
```

Related U.S. Application Data continuation of application No. PCT/CN2021/074648, filed on Feb. 1, 2021.

(56) References Cited

U.S. PATENT DOCUMENTS

| | | | | |
|---|---|---|---|---|
| 2019/0140729 | A1* | 5/2019 | Zhang | H04W 52/16 |
| 2019/0182697 | A1 | 6/2019 | Zhang et al. | |
| 2019/0199413 | A1 | 7/2019 | Sundararajan et al. | |
| 2019/0288765 | A1 | 9/2019 | Lee et al. | |
| 2020/0205187 | A1* | 6/2020 | Khoshnevisan | H04L 5/0023 |
| 2021/0105778 | A1* | 4/2021 | Zhou | H04W 80/02 |
| 2022/0078766 | A1* | 3/2022 | Li | H04B 7/088 |
| 2022/0368493 | A1* | 11/2022 | Yang | H04L 5/0076 |
| 2022/0400041 | A1* | 12/2022 | Ling | H04L 25/0224 |

FOREIGN PATENT DOCUMENTS

| | | |
|---|---|---|
| JP | 2019530277 A | 10/2019 |
| WO | 2018135986 A1 | 7/2018 |
| WO | 2019195528 A1 | 10/2019 |

OTHER PUBLICATIONS

Partial Supplementary European Search Report for Application No. 21751055.1-1206, dated Jun. 5, 2023, 18 Pages.

ZTE "On multi-PDCCH design for multi-TRP" 3GPP TSG RAN WG1 #97, Reno, USA, May 2019, R1-1906242, 4 Pages.

VIVO "Discussion on Multi-Beam Operation" 3GPP TSG RAN WG1 Ad-Hoc Meeting 1901, Taipei, Jan. 2019, R1-1900138, 10 Pages.

First Office Action for Chinese Application No. 202010082875.6, dated Dec. 27, 2021, 7 Pages.

International Search Report and Written Opinion for Application No. PCT/CN2021/074648, dated Apr. 23, 2021, 8 Pages.

VIVO, "Discussion on Enhancements on Multi-TRP/Panel Transmission," 3GPP TSG RAN WG1 #95, Agenda item 7.2.8.2, Nov. 12-16, 2018, R1-1812323, Spokane, Washington, USA, 7 Pages.

VIVO, "Discussion on Enhancements on Multi-Beam Operation," 3GPP TSG RAN WG1 #95, Agenda item 7.2.8.3, Nov. 12-16, 2018, R1-1812324, Spokane, Washington, USA, 10 Pages.

Qualcomm Incorporated, "Multi-TRP Enhancements," 3GPP TSG-RAN WG1 #97, Agenda item 7.2.8.2, May 13-17, 2019, R1-1907289, Reno, Nevada, USA, 25 Pages.

Nonfinal Rejection for copending U.S. Appl. No. 17/875,289, dated Jun. 15, 2023, 8 Pages.

* cited by examiner

BEAM INDICATION METHOD AND APPARATUS, DEVICE, AND MEDIUM

CROSS-REFERENCE TO RELATED APPLICATIONS

This application is a continuation of U.S. application Ser. No. 17/875,289 filed on Jul. 27, 2022, which is a continuation of International Application No. PCT/CN2021/074648 filed on Feb. 1, 2021, which claims priority to Chinese Patent Application No. 202010082875.6 filed on Feb. 7, 2020, which are incorporated herein by reference in their entireties.

TECHNICAL FIELD

The present invention relates to the field of mobile communications technologies, and in particular, to a beam indication method and apparatus, a device, and a medium.

BACKGROUND

Analog beamforming features full-band transmission, and array elements in each polarization direction on a panel of each high-frequency antenna array can transmit only analog beams in a time division multiplexed manner. A beamforming weight for each analog beam is implemented by adjusting parameters of radio frequency front-end devices such as a phase shifter.

Currently, a polling mode is usually used to train an analog beamforming vector. To be specific, array elements in each polarization direction on each antenna panel take turns to transmit training signals (that is, candidate beamforming vectors) at prescribed times in a time division multiplexed manner. Terminal devices feed back beam reports after performing measurement, so that the network-side device uses the training signals to implement emission of analog beams for the next service transmission.

After the beam measurement and beam reporting, the network-side device may provide beam indications for downlink and uplink channels or reference signals, for the establishment of a beam link between the network-side device and the terminal device to transmit the channels or the reference signals.

Currently available is a beam indication solution for scenarios with a single transmission and reception point (TRP) but no beam indication solution for multi-TRP scenarios. If the beam indication solution for the single-TRP scenario is used for the multi-TRP scenario, an error will occur in transmission of a channel or a reference signal.

SUMMARY

According to a first aspect, an embodiment of the present invention provides a beam indication method, including:
  receiving beam indication information transmitted by a network-side device, where the beam indication information is used to indicate a plurality of pieces of beam information of a channel or a reference signal, and the plurality of pieces of beam information correspond to different TRP identification information; and
  transmitting the channel or the reference signal according to the beam indication information.

According to a second aspect, an embodiment of the present invention provides a beam indication method, including:
  transmitting beam indication information to a terminal device, so that the terminal device transmits a channel or a reference signal according to the beam indication information, where the beam indication information is used to indicate a plurality of pieces of beam information of the channel or the reference signal, and the plurality of pieces of beam information correspond to different TRP identification information.

According to a third aspect, an embodiment of the present invention provides a beam indication apparatus, including:
  a receiving module, configured to receive beam indication information transmitted by a network-side device, where the beam indication information is used to indicate a plurality of pieces of beam information of a channel or a reference signal, and the plurality of pieces of beam information correspond to different TRP identification information; and
  a transmission module, configured to transmit the channel or the reference signal according to the beam indication information.

According to a fourth aspect, an embodiment of the present invention provides a beam indication apparatus, including:
  a transmission module, configured to transmit beam indication information to a terminal device, so that the terminal device transmits a channel or a reference signal according to the beam indication information, where the beam indication information is used to indicate a plurality of pieces of beam information of the channel or the reference signal, and the plurality of pieces of beam information correspond to different TRP identification information.

According to a fifth aspect, an embodiment of the present invention provides a terminal device, including a memory, a processor, and a computer program stored in the memory and capable of running on the processor, where
  when the processor executes the computer program, the beam indication method provided by the first aspect of the embodiments of the present invention is implemented.

According to a sixth aspect, an embodiment of the present invention provides a network-side device, including a memory, a processor, and a computer program stored in the memory and capable of running on the processor, where
  when the processor executes the computer program, the beam indication method provided by the second aspect of the embodiments of the present invention is implemented.

According to a seventh aspect, an embodiment of the present invention provides a computer-readable storage medium, where the computer-readable storage medium stores a computer program, and when the computer program is executed by a processor, the beam indication method provided by the first aspect or the second aspect of the embodiments of the present invention is implemented.

BRIEF DESCRIPTION OF DRAWINGS

To describe the technical solutions in the embodiments of the present invention more clearly, the following briefly introduces the accompanying drawings required for describing the embodiments of the present invention. A person of ordinary skill in the art may still derive other drawings from these accompanying drawings.

DETAILED DESCRIPTION

Figure 1:
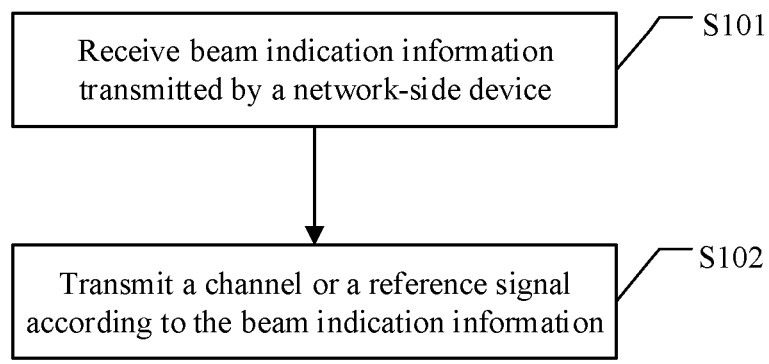
FIG. 1 is a schematic flowchart of a beam indication method applied to a terminal device according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention shall fall within the protection scope of the present invention.

In some embodiments of the present invention, after a beam measurement and beam reporting, a network-side device may provide a beam indication for a downlink/uplink channel or a reference signal, where the beam indication is used to establish a beam link between the network-side device and a terminal device to transmit the channel or the reference signal.

For a beam indication of a physical downlink control channel (PDCCH), the network-side device uses radio resource control (RRC) signaling to configure K pieces of transmission configuration indication (TCI) state information for each control resource set (CORESET). When K>1, a media access control (MAC) control element (CE) indicates or activates one piece of TCI state information. When K=1, no additional MAC CE command is required. When monitoring the PDCCH, the terminal device uses same quasi-co-location (QCL) information, that is, same TCI state information, for all search spaces in the CORESET, to monitor the PDCCH. A reference signal (RS) (for example, a periodic channel state information reference signal (CSI-RS) resource, a semi-persistent CSI-RS resource, or a synchronization signal block) in the TCI state information is QCLed with terminal device specific PDCCH demodulation reference signal (DMRS) ports. The terminal device may learn, based on the TCI state information, which receive beam is used to receive the PDCCH.

For a beam indication of a physical downlink shared channel (PDSCH), the network-side device configures M pieces of TCI state information by using RRC signaling, then uses a MAC CE command to activate 2N pieces of TCI state information, and then uses an N-bit TCI field of DCI to notify the TCI state information, where a reference signal in the TCI state information is QCLed with a DMRS port of the PDSCH to be scheduled. The terminal device may learn, based on the TCI state information, which receive beam is used to receive the PDSCH.

For beam indications for CSI-RS, in the case of a periodic CSI-RS, the network-side device configures QCL information for a CSI-RS resource by using RRC signaling. In the case of a semi-persistent CSI-RS, the network-side device indicates QCL information of a CSI-RS resource when the network-side device uses a MAC CE command to activate the CSI-RS resource from a CSI-RS resource set configured by RRC. When In the case of an aperiodic CSI-RS, the network-side device configures QCL for a CSI-RS resource by using RRC signaling, and uses downlink control information (DCI) to trigger the CSI-RS.

For a beam indication of a physical uplink control channel (PUCCH), the network-side device uses RRC signaling to configure spatial relation information for each PUCCH resource by using a parameter PUCCH-SpatialRelationInfo. When a plurality of pieces of spatial relation information are configured for the PUCCH resource, the network-side device uses a MAC CE to indicate or activate one of the plurality of pieces of spatial relation information. When only one piece of spatial relation information is configured for the PUCCH resource, no additional MAC CE command is required.

For a beam indication of a physical uplink shared channel (PUSCH), spatial relation information of the PUSCH is indicated as follows: When the PUSCH is scheduled by using DCI carried by the PDCCH, each SRI codepoint of a sounding reference signal resource indicator (SRI) field in the DCI indicates one SRI, and the SRI is used to indicate the spatial relation information of the PUSCH.

For a beam indication of a sounding reference signal (SRS), when an SRS type is a periodic SRS, the network-side device configures spatial relation information for an SRS resource by using RRC signaling. When the SRS type is a semi-persistent SRS, the network-side device uses a MAC CE command to activate one piece of spatial relation information from a group of spatial relation information configured by RRC. When the SRS type is an aperiodic SRS, the network-side device configures spatial relation information for an SRS resource by using RRC signaling.

For a multi-TRP scenario, based on the transmission mode of control information, DCI may be classified into single DCI and multi-DCI. For the former, one TRP transmits DCI to schedule data transmission on a plurality of TRPs. For the latter, a plurality of TRPs are allowed to transmit DCI to respectively schedule data transmission on the TRPs.

When the DCI schedules a PDSCH, when a scheduling offset (scheduling offset, or time offset) between the DCI and the PDSCH is less than or equal to a preset threshold, a default beam needs to be used to transmit the PDSCH.

For multi-DCI based multi-TRP transmission, if a control resource set pool index (CORESETPoolIndex) is configured, when the scheduling offset is less than or equal to the preset threshold, the terminal device assumes that PDSCH DMRS ports are QCLed with an RS in QCL information of a PDCCH in a control resource set with a lowest index (CORESET with lowest index) configured with a same CORESETPoolIndex value.

The CORESET with lowest index is a CORESET with lowest index among CORESETs that need to be monitored by the terminal device and correspond to respective CORESETPoolIndex values, in a latest slot. The latest slot is a slot of at least one CORESET associated with a corresponding CORESETPoolIndex, in an active bandwidth part (BWP) of a serving cell.

If the terminal device does not support this feature, regardless of how the CORESETPoolIndex is configured, the CORESET with lowest index in the latest slot is the CORESET with lowest index among the CORESETs that need to be monitored by the terminal device, and is irrelevant to the CORESETPoolIndex.

For single-DCI based multi-TRP transmission, when the foregoing scheduling offset is less than or equal to the preset threshold, and after receiving a command for activating TCI state information of a terminal device specific PDSCH, the terminal device assumes that PDSCH DMRS ports use a QCL parameter of default TCI state information.

To be specific, in a TCI state used for PDSCH activation, TCI state information corresponding to a lowest codepoint is selected from TCI codepoints including two different pieces of TCI state information.

The spatial relation information, TCI state information, QCL information, and QCL parameter represent beam information.

Downlink beam information is usually represented by TCI state information and QCL information. Uplink beam information is usually represented by spatial relation information.

Currently, in transmission of each channel or reference signal in the multi-TRP scenario, there is no conclusion on how to provide a beam indication. If a beam indication in a single-TRP scenario is still used, it is impossible to determine a specific TRP for which beam information is indicated, resulting in incorrect transmission.

Based on this, some embodiments of the present invention provide a beam indication method for a multi-TRP scenario.

Specifically, in the multi-TRP scenario, the following beam indication method is used for channels or reference signals:

A network-side device transmits beam indication information to a terminal device, where the beam indication information is used to indicate a plurality of pieces of beam information of a channel or a reference signal, and the plurality of pieces of beam information correspond to different TRP identification information, and the terminal device transmits the channel or the reference signal according to the beam indication information.

In the embodiments of the present invention, beam indications can be provided for multi-TRP scenarios by indicating the plurality of pieces of beam information corresponding to different TRP identification information, and correct transmission of the channel or the reference signal in the multi-TRP scenario can be ensured.

In some possible implementations of the embodiments of the present invention, the beam information may further include TRP identification information, where the TRP identification information may be a CORESETPoolIndex.

For a PDCCH, a TCI state pool, also referred to as a group of candidate TCI states, is configured by RRC. The TCI state pool may correspond to all TRP identification information, or one TCI state pool is correspondingly configured for each piece of TRP identification information. If the TRP identification information belongs to different cells, each piece of TRP identification information may correspond to a TCI state pool configured by a network for a cell to which the TRP identification information belongs. A MAC CE activates TCI state information of the PDCCH.

When a PDCCH is transmitted sequentially or simultaneously by a plurality of TRPs, a TCI state identifier (ID) configured by RRC or activated by a MAC CE corresponds to a plurality of QCL RSs (such as QCL-TypeD RSs) respectively used to determine QCL information of the PDCCH corresponding to different TRP identification information; or a MAC CE is used to activate a plurality of pieces of TCI state information for the PDCCH, where the plurality of pieces of TCI state information are respectively used to determine QCL information of the PDCCH corresponding to different TRP identification information. In other words, TCI state information including a plurality of QCL RSs is activated from the TCI state pool, or a plurality of pieces of TCI state information are activated from the TCI state pool. The plurality of QCL RSs correspond to different TRP identification information; and the plurality of pieces of TCI state information correspond to different TRP identification information.

There is a correspondence between the plurality of QCL RSs and different TRP identification information. There is a correspondence between the plurality of pieces of TCI state information and different TRP identification information. The correspondence between the plurality of QCL RSs or the plurality of pieces of TCI state information and different TRP identification information may be determined according to a preset rule, for example, an order of indexes.

When a MAC CE activates TCI state information of a PDCCH on a BWP of a component carrier (CC), the TCI state information is applied to a first PDCCH, where a CORESET in which the first PDCCH is located is a CORESET having a same CORESET identifier and corresponding to same TRP identification information as a CORESET in which the PDCCH is located, among all CCs in a CC list in which the CC is located; or a CORESET in which the first PDCCH is located is all CORESETs corresponding to same TRP identification information as a CORESET in which the PDCCH is located, among all CCs in a CC list in which the CC is located.

When a MAC CE activates TCI state information of a second PDCCH corresponding to a piece of TRP identification information, the TCI state information is applied to all PDCCHs corresponding to the TRP identification information.

The second PDCCH may be a PDCCH in any control resource set corresponding to the TRP identification information; or a PDCCH in a control resource set having a preset control resource set identifier and corresponding to the TRP identification information.

In the embodiments of the present invention, beam indications can be provided for multi-TRP scenarios by indicating the plurality of pieces of TCI state information corresponding to different TRP identification information, and correct transmission of the PDCCH in the multi-TRP scenario can be ensured.

For a PDSCH, when there is no TCI field in DCI for scheduling the PDSCH, for a single-DCI mode, the PDSCH uses TCI state information of a PDCCH on which scheduling DCI is located; or the PDSCH uses a plurality of pieces of TCI state information corresponding to a lowest codepoint among codepoints containing a plurality of pieces of TCI state information in a TCI field. The plurality of pieces of TCI state information are respectively used to determine that the PDSCH corresponds to QCL information of a plurality of TRPs, that is, the plurality of pieces of TCI state information correspond to different TRP identification information.

For a multi-DCI mode, the PDSCH uses TCI state information of a PDCCH on which scheduling DCI is located. For example, if a PDCCH 1 of a TRP 1 schedules a PDSCH 1, the PDSCH 1 uses TCI state information of the PDCCH 1.

When a MAC CE activates a group of TCI state information of a PDSCH on a BWP of a CC, the group of TCI state information is applied to all PDSCHs corresponding to same TRP identification information as the PDSCH, among all CCs in a CC list in which the CC is located.

TRP identification information may be explicitly added to a MAC CE that activates a group of TCI state information.

When the PDCCH is used for cross-carrier scheduling of the PDSCH, and a scheduling offset is less than or equal to a preset threshold, TCI state information of the scheduled PDSCH is determined based on TCI state information with a smallest ID in a group of TCI state information corresponding to preset TRP identification information and activated by the network-side device for the PDSCH.

The preset TRP identification information may be TRP identification information corresponding to the scheduled PDSCH; or may be TRP identification information corresponding to the PDCCH; or may be TRP identification information having a preset value; or may be TRP identification information corresponding to the TCI state information indicated by the DCI of the PDCCH, or the like.

In the embodiments of the present invention, beam indications can be provided for multi-TRP scenarios by indicating the plurality of pieces of TCI state information corresponding to different TRP identification information, and correct transmission of the PDSCH in the multi-TRP scenario can be ensured.

For a PUCCH, the network-side device configures a spatial relation information pool by using RRC signaling. The spatial relation information pool may correspond to all TRP identification information; or a spatial relation information pool is configured for each piece of TRP identification information. If TRP identification information belongs to different cells, each piece of TRP identification information may correspond to a spatial relation information pool configured for a cell to which the TRP identification information belongs. A MAC CE activates spatial relation information of the PUCCH.

When a PUCCH is transmitted sequentially or simultaneously by a plurality of TRPs, spatial relation information configured by RRC or activated by a MAC CE includes a plurality of source reference signals respectively used to determine the PUCCH corresponding to different TRP identification information; or a MAC CE is used to activate a plurality of pieces of spatial relation information for the PUCCH, where the plurality of pieces of spatial relation information are respectively used to determine the PUCCH corresponding to different TRP identification information. In other words, spatial relation information including a plurality of source reference signals is activated from the spatial relation information pool, or a plurality of pieces of spatial relation information are activated from the spatial relation information pool. The plurality of source reference signals correspond to different TRP identification information; and the plurality of pieces of spatial relation information correspond to different TRP identification information.

There is a correspondence between the plurality of source reference signals and different TRP identification information. There is a correspondence between the plurality of pieces of spatial relation information and different TRP identification information. The correspondence between the plurality of source reference signals or the plurality of pieces of spatial relation information and different TRP identification information may be determined according to a preset rule, for example, an order of indexes.

When a MAC CE activates spatial relation information of a PUCCH on a BWP of a component carrier (CC), the spatial relation information is applied to a PUCCH having a same PUCCH resource identifier and corresponding to same TRP identification information as the PUCCH, among all CCs in a CC list in which the CC is located; or the spatial relation information is applied to all PUCCHs corresponding to same TRP identification information as the PUCCH, among all CCs in a CC list in which the CC is located.

When a MAC CE activates spatial relation information of a first PUCCH corresponding to a piece of TRP identification information, the spatial relation information is applied to all PUCCHs corresponding to the TRP identification information.

The first PUCCH may be any PUCCH corresponding to the TRP identification information or a PUCCH having a preset PUCCH resource identifier and corresponding to the TRP identification information.

In the embodiments of the present invention, beam indications can be provided for multi-TRP scenarios by indicating the plurality of pieces of spatial relation information corresponding to different TRP identification information, and correct transmission of the PUCCH in the multi-TRP scenario can be ensured.

When the network-side device activates a plurality of pieces of spatial relation information for a PUCCH resource, the terminal device may autonomously select one from the plurality of pieces of spatial relation information, and transmit the PUCCH to the network-side device.

When the spatial relation information of the PUCCH is not configured, the spatial relation information of the PUCCH may be determined based on default TCI state information or QCL information corresponding to preset TRP identification information.

The preset TRP identification information may be TRP identification information associated with a PUCCH resource and configured by RRC or indicated by a MAC CE, or TRP identification information corresponding to a PDCCH for scheduling a PUCCH, or TRP identification information having a default identifier value.

The default TCI state information or the QCL information may be TCI state information or QCL information of a CORESET having a smallest CORESET ID and corresponding to the preset TRP; or TCI state information having a smallest TCI state ID in a group of activated TCI state information corresponding to the preset TRP identification information; or TCI state information corresponding to a lowest codepoint in a TCI field of DCI; or TCI state information corresponding to a lowest codepoint among codepoints containing one piece of TCI state information in a TCI field of DCI; or TCI state information corresponding to a lowest codepoint among codepoints containing a plurality of pieces of TCI state information in a TCI field of DCI.

In the embodiments of the present invention, beam indications can be provided for multi-TRP scenarios by indicating the plurality of pieces of spatial relation information corresponding to different TRP identification information, and correct transmission of the PUCCH in the multi-TRP scenario can be ensured.

For a PUSCH, a plurality of SRS resources may be associated with different TRP identification information (for example, each piece of TRP identification information corresponds to a group of SRS resources), or spatial relation information of an SRS resource may be associated with TRP identification information, or a source reference signal in spatial relation information of an SRS resource is associated with TRP identification information. DCI indicates a plurality of SRIs, or indicates an SRI having a plurality of pieces of spatial relation information, or indicates an SRI having spatial relation information of a plurality of source reference signals corresponding to different TRP identification information, where the plurality of source reference signals are associated with different TRP identification information.

When the DCI indicates a plurality of SRIs, or indicates an SRI having a plurality of pieces of spatial relations, or indicates an SRI having spatial relation information of a plurality of source reference signals, the terminal device may autonomously select one SRI from the plurality of SRIs to determine spatial relation information of the PUSCH; or select one piece of spatial relation information from one SRI having a plurality of pieces of spatial relations to determine spatial relation information of the PUSCH; or select one source reference signal from one SRI having spatial relation information of a plurality of source reference signals.

In the embodiments of the present invention, beam indications can be provided for multi-TRP scenarios by indicating the plurality of pieces of beam information corresponding to different TRP identification information, and correct transmission of the PUSCH in the multi-TRP scenario can be ensured.

For a CSI-RS, if the CSI-RS is an aperiodic CSI-RS, and a scheduling offset (or triggering interval) between DCI and the aperiodic CSI-RS is less than or equal to a preset threshold, and there is another downlink signal on a symbol on which the CSI-RS is located, TCI state information of the CSI-RS is determined based on TCI state information of the another downlink signal.

When the another downlink signal is a PDSCH, for a single-DCI mode, when a TCI codepoint of the PDSCH indicated by DCI corresponds to two pieces of TCI state information, TCI state information of the PDSCH corresponding to same TRP identification information as the TCI state information of the CSI-RS (or a source RS in the TCI state information) is used as the TCI state information of the CSI-RS; or TCI state information of the PDSCH corresponding to same TRP identification information as a PDCCH triggering the CSI-RS is used as the TCI state information of the CSI-RS; or default TCI state information in a group of TCI state information corresponding to preset TRP identification information is used as the TCI state information of the CSI-RS.

The correspondence between the TCI state information and the TRP identification information may be indicated by the network-side device (for example, RRC or a MAC CE).

The default TCI state information may be TCI state information having a preset TCI state ID.

The preset TRP identification information may be TRP identification information corresponding to the PDSCH; or may be TRP identification information corresponding to the PDCCH; or may be TRP identification information corresponding to the TCI state information of the CSI-RS.

For a multi-DCI mode, the TCI state information of the CSI-RS may be determined based on TCI state information of the PDSCH corresponding to preset TRP identification information.

The preset TRP identification information may be TRP identification information corresponding to the PDSCH; or may be TRP identification information corresponding to a PDCCH for scheduling the PDSCH; or may be TRP identification information corresponding to the TCI state information of the CSI-RS.

When the another downlink signal is a periodic CSI-RS or a semi-persistent CSI-RS or another aperiodic CSI-RS with an effective TCI state, if the aperiodic CSI-RS corresponds to same TRP identification information as the another CSI-RS, the TCI state information of the CSI-RS is determined based on the TCI state information of the another CSI-RS. Otherwise, the TCI state information of the another CSI-RS may be used, or default TCI state information corresponding to same TRP identification information as the aperiodic CSI-RS may be used (for example, TCI state information having a smallest TCI state ID in a group of TCI state information activated by a MAC CE).

If there is no other downlink signal on a symbol on which the CSI-RS is located, TCI state information of the CSI-RS is determined based on TCI state information of a CORESET having a smallest CORESET ID, among CORESETs corresponding to same TRP identification information as the CSI-RS or corresponding to same TRP identification information as a PDCCH triggering the CSI-RS.

When the network-side device indicates TCI state information of a CSI-RS on a BWP of a CC, the TCI state information is applied to all CSI-RSs corresponding to same TRP identification information as the CSI-RS, among all CCs in a CC list in which the CC is located; or the TCI state information is applied to a CSI-RS having a same CSI-RS resource index and corresponding to same TRP identification information as the CSI-RS, among all CCs in a CC list in which the CC is located.

In the embodiments of the present invention, beam indications can be provided for multi-TRP scenarios by indicating the plurality of pieces of TCI state information corresponding to different TRP identification information, and correct transmission of the CSI-RS in the multi-TRP scenario can be ensured.

For an SRS, the network-side device may configure or indicate that an SRS resource has a plurality of pieces of spatial relations corresponding to different TRP identification information; or a spatial relation of an SRS resource includes a plurality of source RSs corresponding to different TRP identification information; or when spatial relation information of an SRS is configured by RRC or activated by a MAC CE, corresponding TRP identification information is carried.

When a MAC CE activates spatial relation information of an SRS on a BWP of a CC, the spatial relation information is applied to all SRSs corresponding to same TRP identification information as the SRS, among all CCs in a CC list in which the CC is located; or the spatial relation information is applied to an SRS having a same SRS resource index and corresponding to same TRP identification information as the SRS, among all CCs in a CC list in which the CC is located.

The MAC CE may carry the TRP identification information.

When the spatial relation information of the SRS is not configured, the spatial relation information of the SRS may be determined based on default TCI state information or QCL information corresponding to preset TRP identification information.

The preset TRP identification information may be TRP identification information configured by RRC or indicated by a MAC CE and associated with an SRS resource.

The default TCI state information or the QCL information may be TCI state information or QCL information of a CORESET having a smallest CORESET ID and corresponding to the preset TRP identification information; or TCI state information having a smallest TCI state ID in a group of activated TCI state information corresponding to the preset TRP identification information; or TCI state information corresponding to a lowest codepoint in a TCI field of DCI; or TCI state information corresponding to a lowest codepoint among codepoints containing one piece of TCI state information in a TCI field of DCI; or TCI state information corresponding to a lowest codepoint among codepoints containing a plurality of pieces of TCI state information in a TCI field of DCI.

In the embodiments of the present invention, beam indications can be provided for multi-TRP scenarios by indicating the plurality of pieces of beam information of the channel or the reference signal that correspond to different TRP identification information, and correct transmission of the SRS in the multi-TRP scenario can be ensured.

The network-side device may be a base station, and the base station may be a commonly used base station, or may be an evolved base station (evolved node base station, eNB), or may be a device in a 5G system, such as a network-side device (for example, a next-generation base station (next generation node base station, gNB) or a transmission and reception point (TRP)) or a cell, or may be a network-side device in a future evolved communications system. However, the terms do not constitute any limitation on the protection scope of the present invention. In some embodiments, the terminal device may be a mobile phone, a tablet computer, a smart watch, a smart appliance, or the like. This is not limited in the embodiments of the present invention.

Based on the foregoing description, an embodiment of the present invention provides a beam indication method applied to a terminal device. FIG. 1 is a schematic flowchart of a beam indication method applied to a terminal device according to an embodiment of the present invention. The beam indication method applied to the terminal device may include the following steps.

S101. Receive beam indication information transmitted by a network-side device.

The beam indication information is used to indicate a plurality of pieces of beam information of a channel or a reference signal, and the plurality of pieces of beam information correspond to different TRP identification information.

S102. Transmit the channel or the reference signal according to the beam indication information.

The beam indication method in this embodiment of the present invention can provide a beam indication for a multi-TRP scenario and ensure correct transmission of the channel or the reference signal in the multi-TRP scenario.

In some possible implementations of this embodiment of the present invention, the channel includes any one of the following: a PDCCH, a PDSCH, a PUCCH, and a PUSCH; and the reference signal may include a CSI-RS or an SRS.

In some possible implementations of this embodiment of the present invention, the channel includes a PDCCH; and the beam indication information may include any one of the following:
  a TCI state pool corresponding to all TRP identification information;
  a TCI state pool corresponding to each piece of TRP identification information; and
  TCI state pools corresponding to different cells, where each piece of TRP identification information uses a TCI state pool corresponding to a cell to which the TRP identification information belongs.

In some possible implementations of this embodiment of the present invention, before the transmitting the channel or the reference signal according to the beam indication information, the beam indication method applied to the terminal device according to this embodiment of the present invention further includes:
  activating, from the TCI state pool, TCI state information corresponding to different TRP identification information.

In some possible implementations of this embodiment of the present invention, the activating, from the TCI state pool, TCI state information corresponding to different TRP identification information includes:

activating, from the TCI state pool, TCI state information including a plurality of quasi-co-location reference signals, where the plurality of quasi-co-location reference signals correspond to different TRP identification information; or
  activating a plurality of pieces of TCI state information from the TCI state pool, where the plurality of pieces of TCI state information correspond to different TRP identification information.

In some possible implementations of this embodiment of the present invention, a correspondence between the quasi-co-location reference signals and the TRP identification information or a correspondence between the TCI state information and the TRP identification information is determined according to a preset rule.

In some possible implementations of this embodiment of the present invention, when the TCI state information is TCI state information of a PDCCH on a first BWP of a first CC and activated by a MAC CE, the TCI state information is applied to a first PDCCH, where a CORESET in which the first PDCCH is located is a CORESET having a same CORESET identifier and corresponding to same TRP identification information as a CORESET in which the PDCCH is located, among all CCs in a CC list in which the first CC is located; or a CORESET in which the first PDCCH is located is all CORESETs corresponding to same TRP identification information as a CORESET in which the PDCCH is located, among all CCs in a CC list in which the first CC is located.

In some possible implementations of this embodiment of the present invention, when the TCI state information is TCI state information of a second PDCCH corresponding to first TRP identification information and activated by a MAC CE, the TCI state information is applied to all PDCCHs corresponding to the first TRP identification information.

In some possible implementations of this embodiment of the present invention, the second PDCCH may include:
  a PDCCH in any CORESET corresponding to the first TRP identification information; or
  a PDCCH in a CORESET having a preset CORESET identifier and corresponding to the first TRP identification information.

In some possible implementations of this embodiment of the present invention, the channel includes a PDSCH; and
  if there is no TCI field in DCI for scheduling the PDSCH, a mode of the DCI is a single-DCI mode, and the beam indication information includes:
  TCI state information of a PDCCH on which the DCI is located; or
  a plurality of pieces of TCI state information corresponding to a lowest codepoint among codepoints containing a plurality of pieces of TCI state information in a TCI field of the DCI, where the plurality of pieces of TCI state information correspond to different TRP identification information; or
  if there is no TCI state field in DCI for scheduling the PDSCH, a mode of the DCI is a multi-DCI mode, and the beam indication information includes:
  TCI state information of a PDCCH on which the DCI is located.

In some possible implementations of this embodiment of the present invention, when TCI state information is a group of TCI state information of a PDSCH on a second BWP of a second CC and activated by a MAC CE, the group of TCI state information is applied to all PDSCHs corresponding to same TRP identification information as the PDSCH, among all CCs in a CC list in which the second CC is located.

In some possible implementations of this embodiment of the present invention, when the PDCCH is used for cross-carrier scheduling of the PDSCH, and a scheduling offset is less than or equal to a preset offset threshold, TCI state information of the scheduled PDSCH is determined based on TCI state information with a smallest identifier in a group of TCI state information corresponding to preset TRP identification information and activated by the network-side device for the PDSCH.

In some possible implementations of this embodiment of the present invention, the preset TRP identification information includes any one of the following:
 TRP identification information corresponding to the scheduled PDSCH;
 TRP identification information corresponding to the PDCCH;
 TRP identification information having a preset value; and
 TRP identification information corresponding to the TCI state information indicated by the DCI of the PDCCH.

In some possible implementations of this embodiment of the present invention, the channel includes a PUCCH; and the beam indication information includes any one of the following:
 a spatial relation information pool corresponding to all TRP identification information;
 a spatial relation information pool corresponding to each piece of TRP identification information; and
 spatial relation information pools corresponding to different cells, where each piece of TRP identification information uses a spatial relation information pool corresponding to a cell to which the TRP identification information belongs.

In some possible implementations of this embodiment of the present invention, before the transmitting the channel or the reference signal according to the beam indication information, the beam indication method applied to the terminal device according to this embodiment of the present invention further includes:
 activating, from the spatial relation information pool, spatial relation information corresponding to different TRP identification information.

In some possible implementations of this embodiment of the present invention, the activating, from the spatial relation information pool, spatial relation information corresponding to different TRP identification information includes:
 activating, from the spatial relation information pool, spatial relation information including a plurality of source reference signals, where the plurality of source reference signals correspond to different TRP identification information; or
 activating a plurality of pieces of spatial relation information from the spatial relation information pool, where the plurality of pieces of spatial relation information correspond to different TRP identification information.

In some possible implementations of this embodiment of the present invention, a correspondence between the source reference signals and the TRP identification information or a correspondence between the spatial relation information and the TRP identification information is determined according to a preset rule.

In some possible implementations of this embodiment of the present invention, when the spatial relation information is spatial relation information of a PUCCH on a third BWP of a third CC and activated by a MAC CE, the spatial relation information is applied to a PUCCH having a same PUCCH resource and corresponding to same TRP identification information as the PUCCH, among all CCs in a CC list in which the third CC is located; or the spatial relation information is applied to all PUCCHs corresponding to same TRP identification information as the PUCCH, among all CCs in a CC list in which the third CC is located.

In some possible implementations of this embodiment of the present invention, when the spatial relation information is spatial relation information of a first PUCCH corresponding to second TRP identification information and activated by a MAC CE, the spatial relation information is applied to all PUCCHs corresponding to the second TRP identification information.

In some possible implementations of this embodiment of the present invention, the first PUCCH may include:
 any PUCCH corresponding to the second TRP identification information; or
 a PUCCH having a preset PUCCH resource identifier and corresponding to the second TRP identification information.

In some possible implementations of this embodiment of the present invention, the beam indication information may further include TRP identification information.

In some possible implementations of this embodiment of the present invention, the beam indication method applied to the terminal device according to this embodiment of the present invention further includes:
 selecting one piece of spatial relation information from a plurality of pieces of spatial relation information.

In some possible implementations of this embodiment of the present invention, the method further includes:
 if the beam indication information does not include spatial relation information of the PUCCH, determining the spatial relation information of the PUCCH based on default TCI state information or QCL information corresponding to preset TRP identification information.

In some possible implementations of this embodiment of the present invention, the preset TRP identification information includes: TRP identification information associated with a PUCCH resource.

In some possible implementations of this embodiment of the present invention, the default TCI state information or the QCL information includes:
 TCI state information or QCL information of a CORESET having a smallest CORESET ID and corresponding to the preset TRP identification information; or
 TCI state information having a smallest TCI state identifier in a group of activated TCI state information corresponding to the preset TRP identification information; or
 TCI state information corresponding to a lowest codepoint in a TCI field of DCI; or
 TCI state information corresponding to a lowest codepoint among codepoints containing one piece of TCI state information in a TCI field of DCI; or
 TCI state information corresponding to a lowest codepoint among codepoints containing a plurality of pieces of TCI state information in a TCI field of DCI.

In some possible implementations of this embodiment of the present invention, the channel includes a PUSCH; and the beam indication information may include:
 a plurality of sounding reference signal resource indicators, where a plurality of sounding reference signal resources are associated with different TRP identification information; or
 one sounding reference signal resource indicator having a plurality of pieces of spatial relation information, where the plurality of pieces of spatial relation information are associated with different TRP identification information; or one sounding reference signal resource indicator having spatial relation information of a plurality of source reference signals, where the plurality of source reference signals are associated with different TRP identification information.

In some possible implementations of this embodiment of the present invention, the beam indication method applied to the terminal device according to this embodiment of the present invention further includes:

selecting one SRI from the plurality of SRIs; or selecting one piece of spatial relation information from one SRI having a plurality of pieces of spatial relation information; or selecting one source reference signal from one sounding reference signal resource indicator having spatial relation information of a plurality of source reference signals.

In some possible implementations of this embodiment of the present invention, the reference signal may include the CSI-RS; and before the transmitting the channel or the reference signal according to the beam indication information, the beam indication method applied to the terminal device according to this embodiment of the present invention further includes:

if the CSI-RS is an aperiodic CSI-RS, and a scheduling offset between DCI and the aperiodic CSI-RS is less than or equal to a preset offset threshold, and there is another downlink signal on a symbol on which the CSI-RS is located, determining TCI state information of the CSI-RS based on TCI state information of the another downlink signal; or if the CSI-RS is an aperiodic CSI-RS, and a scheduling offset between DCI and the aperiodic CSI-RS is less than or equal to a preset offset threshold, and there is no other downlink signal on a symbol on which the CSI-RS is located, determining TCI state information of the CSI-RS based on TCI state information of a CORESET having a smallest CORESET ID, among control resource sets corresponding to same TRP identification information as the CSI-RS or corresponding to same TRP identification information as a PDCCH triggering the CSI-RS.

In some possible implementations of this embodiment of the present invention, if the another downlink signal is a PDSCH, a mode of the DCI is a single-DCI mode; and the determining TCI state information of the CSI-RS based on TCI state information of the another downlink signal includes any one of the following:

determining that TCI state information of the PDSCH corresponding to same TRP identification information as the TCI state information of the CSI-RS is the TCI state information of the CSI-RS;

determining that TCI state information of the PDSCH corresponding to same TRP identification information as a source reference signal in the TCI state information of the CSI-RS is the TCI state information of the CSI-RS;

determining that TCI state information of the PDSCH corresponding to same TRP identification information as the PDCCH triggering the CSI-RS is the TCI state information of the CSI-RS; or determining that default TCI state information in a group of TCI state information corresponding to preset TRP identification information is the TCI state information of the CSI-RS.

In some possible implementations of this embodiment of the present invention, the correspondence between the TCI state information and the TRP identification information is indicated by the network.

In some possible implementations of this embodiment of the present invention, the default TCI state information includes:

TCI state information having a preset TCI state identifier.

In some possible implementations of this embodiment of the present invention, the preset TRP identification information includes:

TRP identification information corresponding to the PDSCH; or

TRP identification information corresponding to the PDCCH; or

TRP identification information corresponding to the TCI state information of the CSI-RS.

In some possible implementations of this embodiment of the present invention, if the another downlink signal is a PDSCH, a mode of the DCI is a multi-DCI mode; and the determining TCI state information of the CSI-RS based on TCI state information of the another downlink signal includes:

determining the TCI state information of the CSI-RS based on TCI state information of the PDSCH corresponding to preset TRP identification information.

In some possible implementations of this embodiment of the present invention, the preset TRP identification information includes:

TRP identification information corresponding to the PDSCH; or

TRP identification information corresponding to the PDCCH for scheduling the PDSCH; or TRP identification information corresponding to the TCI state information of the CSI-RS.

In some possible implementations of this embodiment of the present invention, if the another downlink signal is a periodic CSI-RS or a semi-persistent CSI-RS or another aperiodic CSI-RS with an effective TCI state, the determining TCI state information of the CSI-RS based on TCI state information of the another downlink signal includes:

if the CSI-RS corresponds to same TRP identification information as the another downlink signal, determining the TCI state information of the CSI-RS based on the TCI state information of the another downlink signal; or if the CSI-RS and the another downlink signal correspond to different TRP identification information, determining the TCI state information of the CSI-RS based on the TCI state information of the another downlink signal or default TCI state information corresponding to same TRP identification information as the CSI-RS.

In some possible implementations of this embodiment of the present invention, when the TCI state information is TCI state information of a CSI-RS on a fourth bandwidth part of a fourth component carrier indicated by the network-side device, the TCI state information is applied to all CSI-RSs corresponding to same TRP identification information as the CSI-RS, among all component carriers in a component carrier list in which the fourth component carrier is located; or the TCI state information is applied to a CSI-RS having a same CSI-RS resource index and corresponding to same TRP identification information as the CSI-RS, among all component carriers in a component carrier list in which the fourth component carrier is located.

In some possible implementations of this embodiment of the present invention, the reference signal includes the SRS; and the beam indication information includes:
  one piece of spatial relation information, where the one piece of spatial relation information includes a plurality of source reference signals, and the plurality of source reference signals correspond to different TRP identification information; or
  a plurality of pieces of spatial relation information, where the plurality of pieces of spatial relation information correspond to different TRP identification information.

In some possible implementations of this embodiment of the present invention, when the spatial relation information is spatial relation information of an SRS on a fifth BWP of a fifth CC and activated by a MAC CE, the spatial relation information is applied to all SRSs corresponding to same TRP identification information as the SRS, among all CCs in a CC list in which the fifth CC is located; or the spatial relation information is applied to an SRS having a same SRS resource index and corresponding to same TRP identification information as the SRS, among all CCs in a CC list in which the fifth CC is located.

In some possible implementations of this embodiment of the present invention, the method further includes: if the beam indication information does not include spatial relation information of the SRS, determining the spatial relation information of the SRS based on default TCI state information or QCL information corresponding to preset TRP identification information.

In some possible implementations of this embodiment of the present invention, the preset TRP identification information includes:
  TRP identification information associated with an SRS resource.

In some possible implementations of this embodiment of the present invention, the default TCI state information or the QCL information includes:
  TCI state information or QCL information of a CORESET having a smallest CORESET ID and corresponding to the preset TRP identification information; or
  TCI state information having a smallest TCI state ID in a group of activated TCI state information corresponding to the preset TRP identification information; or
  TCI state information corresponding to a lowest codepoint in a TCI field of DCI; or
  TCI state information corresponding to a lowest codepoint among codepoints containing one piece of TCI state information in a TCI field of DCI; or
  TCI state information corresponding to a lowest codepoint among codepoints containing a plurality of pieces of TCI state information in a TCI field of DCI.

In some possible implementations of this embodiment of the present invention, the TRP identification information may be a CORESETPoolIndex.

An embodiment of the present invention further provides a beam indication method applied to a network-side device. The beam indication method applied to the network-side device may include: transmitting beam indication information to a terminal device, so that the terminal device transmits a channel or a reference signal according to the beam indication information, where the beam indication information is used to indicate a plurality of pieces of beam information of the channel or the reference signal, and the plurality of pieces of beam information correspond to different TRP identification information.

Figure 2:
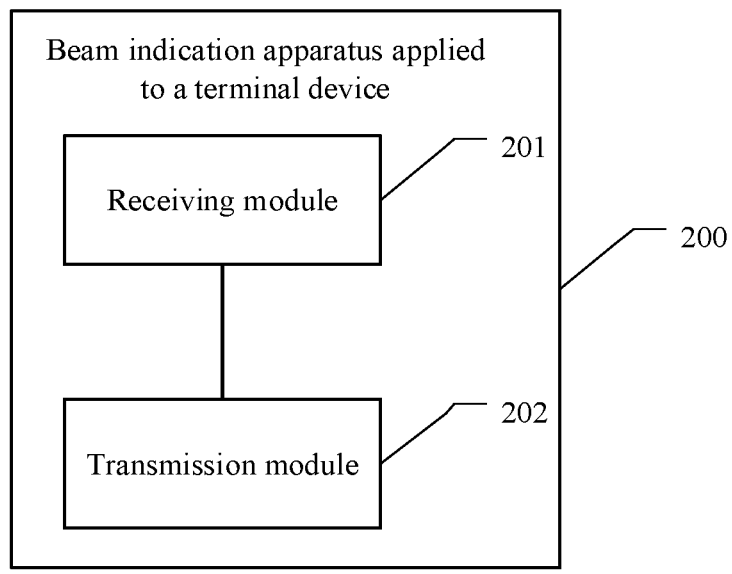
FIG. 2 is a schematic structural diagram of a beam indication apparatus applied to a terminal device according to an embodiment of the present invention.

Corresponding to the foregoing method embodiment, an embodiment of the present invention further provides a beam indication apparatus applied to a terminal device, as shown in FIG. 2. FIG. 2 is a schematic structural diagram of a beam indication apparatus applied to a terminal device according to an embodiment of the present invention. The beam indication apparatus 200 applied to the terminal device may include:
  a receiving module 201, configured to receive beam indication information transmitted by a network-side device,
  where the beam indication information is used to indicate a plurality of pieces of beam information of a channel or a reference signal, and the plurality of pieces of beam information correspond to different TRP identification information; and
  a transmission module 202, configured to transmit the channel or the reference signal according to the beam indication information.

An embodiment of the present invention further provides a beam indication apparatus applied to a network-side device. The beam indication apparatus applied to the network-side device may include a transmission module, configured to transmit beam indication information to a terminal device, so that the terminal device transmits a channel or a reference signal according to the beam indication information, where the beam indication information is used to indicate a plurality of pieces of beam information of the channel or the reference signal, and the plurality of pieces of beam information correspond to different TRP identification information.

Figure 3:
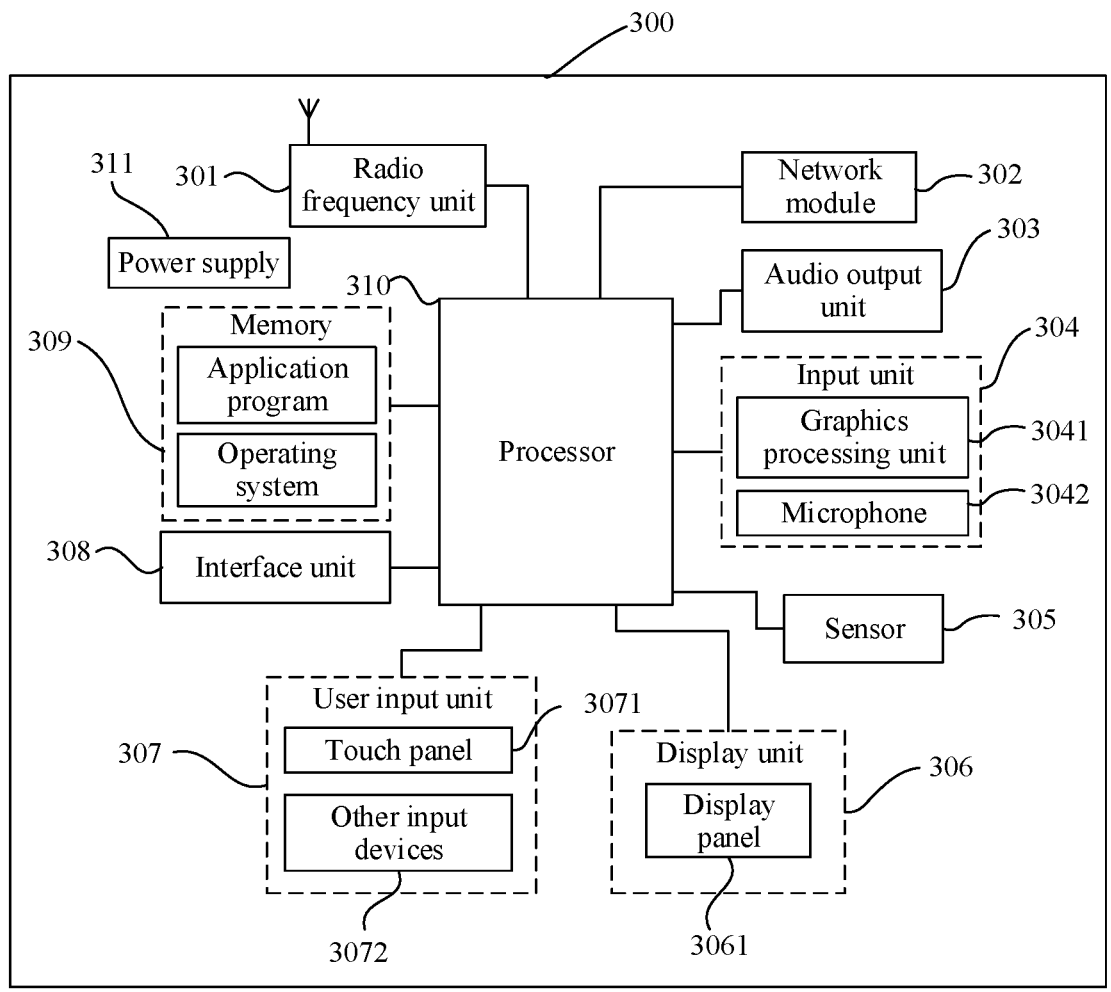
FIG. 3 is a schematic diagram of a hardware structure of a terminal device according to an embodiment of the present invention.

FIG. 3 is a schematic diagram of a hardware structure of a terminal device according to an embodiment of the present invention. The terminal device 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the structure of the terminal device shown in FIG. 3 does not constitute any limitation on the terminal device. The terminal device may include more or fewer components than those shown in the figure, or a combination of some components, or the components disposed differently. In this embodiment of the present invention, the terminal device includes but is not limited to a mobile phone, a tablet computer, a laptop computer, a palmtop computer, a vehicle-mounted terminal, a wearable device, a pedometer, or the like.

The radio frequency unit 301 is configured to receive beam indication information transmitted by a network-side device, and transmit a channel or a reference signal, where the beam indication information is used to indicate a plurality of pieces of beam information of the channel or the reference signal, and the plurality of pieces of beam information correspond to different TRP identification information.

In this embodiment of the present invention, a beam indication can be provided for a multi-TRP scenario, and correct transmission of the channel or the reference signal in the multi-TRP scenario can be ensured.

It should be understood that in this embodiment of the present invention, the radio frequency unit 301 may be configured to receive and transmit signals in an information reception or transmission or call process. Specifically, after receiving downlink data from a base station, the radio frequency unit 301 transmits the downlink data to the processor 310 for processing, and in addition, transmits uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may also communicate with a network and other devices via a wireless communications system.

The terminal device provides a user with wireless broadband internet access through the network module 302, for example, helping the user transmit and receive e-mails, browse web pages, and access streaming media.

The audio output unit 303 may convert audio data received by the radio frequency unit 301 or the network module 302 or stored in the memory 309 into an audio signal and output the audio signal as a sound. Furthermore, the audio output unit 303 may also provide an audio output (for example, a call signal received sound or a message received sound) related to a specific function performed by the terminal device 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042. The graphics processing unit 3041 processes image data of a still picture or video obtained by an image capture apparatus (such as a camera) in a video capture mode or an image capture mode. A processed image frame may be displayed on the display unit 306. The image frame processed by the graphics processing unit 3041 may be stored in the memory 309 (or another storage medium) or be transmitted by the radio frequency unit 301 or the network module 302. The microphone 3042 is capable of receiving sounds and processing such sounds into audio data. The processed audio data can be converted into a format output that can be transmitted to a mobile communication base station through the radio frequency unit 301 in a telephone call mode.

The terminal device 300 further includes at least one sensor 305, for example, an optical sensor, a motion sensor, and other sensors. Specifically, the optical sensor includes an ambient light sensor and a proximity sensor. The ambient light sensor may adjust luminance of the display panel 3061 based on brightness of ambient light, and the proximity sensor may turn off the display panel 3061 and/or backlight when the terminal device 300 moves close to an ear. As a type of motion sensor, an accelerometer sensor can detect magnitudes of accelerations in all directions (usually three axes), can detect a magnitude and a direction of gravity when the terminal device is in a static state, and can be applied to posture recognition (such as screen switching between portrait and landscape, related games, and magnetometer posture calibration) of the terminal device, functions related to vibration recognition (such as pedometer and tapping), and the like. The sensor 305 may also include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided to the user. The display unit 306 may include a display panel 3061, and the display panel 3061 may be configured in a form of a liquid crystal display (LCD), an organic light-emitting diode (OLED), or the like.

The user input unit 307 may be configured to receive input digit or character information and generate key signal input related to user setting and function control of the terminal device. Specifically, the user input unit 307 includes a touch panel 3071 and other input devices 3072. The touch panel 3071 is also referred to as a touchscreen and can collect a touch operation (such as an operation performed by the user on the touch panel 3071 or near the touch panel 3071 with a finger or by using any proper object or accessory such as a stylus) of the user on or near the touch panel 3071. The touch panel 3071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 310, and receives a command transmitted by the processor 310 and executes the command. In addition, the touch panel 3071 may be implemented in a plurality of forms, for example, as a resistive, capacitive, infrared, or surface acoustic wave touch panel. The user input unit 307 may further include the other input devices 3072 in addition to the touch panel 3071. Specifically, the other input devices 3072 may include but are not limited to a physical keyboard, a function key (such as a volume control key or a switch key), a trackball, a mouse, and a joystick. Details are not described herein.

Further, the touch panel 3071 may cover the display panel 3061. When detecting a touch operation on or near the touch panel 3071, the touch panel 3071 transmits the touch operation to the processor 310 to determine a type of a touch event. Then, the processor 310 provides a corresponding visual output on the display panel 3061 based on the type of the touch event. Although in FIG. 3, the touch panel 3071 and the display panel 3061 act as two independent parts to implement input and output functions of the terminal device, in some embodiments, the touch panel 3071 and the display panel 3061 may be integrated to implement the input and output functions of the terminal device. This is not specifically limited herein.

The interface unit 308 is an interface between an external apparatus and the terminal device 300. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 308 may be configured to: receive an input (for example, data information and power) from the external apparatus, and transmit the received input to one or more elements in the terminal device 300, or may be configured to transmit data between the terminal device 300 and the external apparatus.

The memory 309 may be configured to store software programs and various data. The memory 309 may primarily include a program storage area and a data storage area. The program storage area may store an operating system, an application program (such as an audio play function and an image play function) required by at least one function, and the like. The data storage area may store data (such as audio data and a phone book) created based on use of the mobile phone. In addition, the memory 309 may include a high-speed random access memory, and may further include a non-volatile memory such as a disk storage device, a flash memory device, or another volatile solid-state storage device.

The processor 310 is a control center of the terminal device, uses various interfaces and lines to connect parts of the entire terminal device, and executes various functions and processing data of the terminal device by running or executing software programs and/or modules stored in the memory 309 and invoking data stored in the memory 309, so as to perform overall monitoring on the terminal device. The processor 310 may include one or more processing units. Preferably, the processor 310 may integrate an application processor and a modem processor. The application processor mainly processes the operating system, a user interface, an application program, and the like. The modem processor mainly processes wireless communication. It can be understood that the modem processor may alternatively be not integrated in the processor 310.

The terminal device 300 may further include the power supply 311 (such as a battery) for supplying power to the components. Preferably, the power supply 311 may be logically connected to the processor 310 through a power management system. In this way, functions such as charge management, discharge management, and power consumption management are implemented by using the power management system.

In addition, the terminal device 300 includes some functional modules that are not shown. Details are not described herein.

Preferably, an embodiment of the present invention further provides a terminal device, including a processor 310, a memory 309, and a computer program stored in the memory 309 and capable of running on the processor 310. When the computer program is executed by the processor 310, each process of the beam indication method embodiment applied to the terminal device is implemented, with the same technical effect achieved. To avoid repetition, details are not described herein again.

Figure 4:
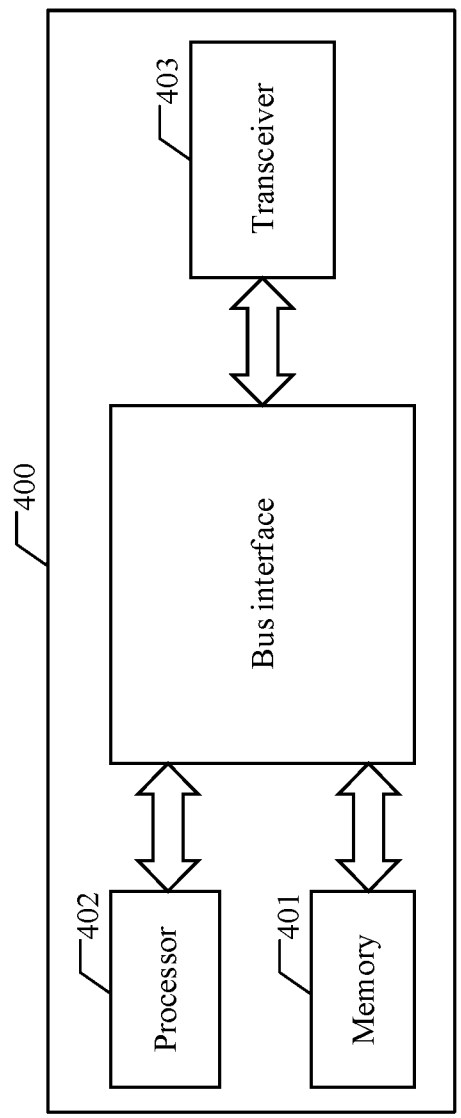
FIG. 4 is a schematic diagram of a hardware structure of a network-side device according to an embodiment of the present invention.

FIG. 4 is a schematic diagram of a hardware structure of a network-side device according to an embodiment of the present invention. The network-side device 400 includes a memory 401, a processor 402, a transceiver 403, and a computer program stored in the memory 401 and capable of running on the processor 402.

The transceiver 403 may be configured to transmit beam indication information to a terminal device, so that the terminal device transmits a channel or a reference signal according to the beam indication information, where the beam indication information is used to indicate a plurality of pieces of beam information of the channel or the reference signal, and the plurality of pieces of beam information correspond to different TRP identification information.

In FIG. 4, a bus architecture may include any quantity of interconnect buses and bridges, specifically for interconnecting various circuits of one or more processors represented by the processor 402 and a memory represented by the memory 401. The bus architecture may further interconnect various other circuits such as a peripheral device, a voltage regulator, and a power management circuit. These are all well known in the art, and therefore are not further described in this specification. A bus interface provides an interface. The transceiver 403 may be a plurality of components, that is, the transceiver 403 includes a transmitter and a receiver, and provides a unit for communicating with various other apparatuses over a transmission medium, where the unit is configured to receive and transmit data under control of the processor 402. The processor 402 is responsible for management of the bus architecture and general processing, and the memory 401 is capable of storing data that is used by the processor 402 during operation.

Preferably, an embodiment of the present invention further provides a network-side device, including a processor 402, a memory 401, and a computer program stored in the memory 401 and capable of running on the processor 402. When the computer program is executed by the processor 402, each process of the beam indication method embodiment applied to the network-side device is implemented, with the same technical effect achieved. To avoid repetition, details are not described herein again.

An embodiment of the present invention further provides a computer-readable storage medium. The computer-readable storage medium stores computer program instructions. When the computer program instructions are executed by a processor, each process of the beam indication method embodiment applied to the terminal device according to the embodiment of the present invention is implemented, or each process of the beam indication method embodiment applied to the network-side device according to the embodiment of the present invention is implemented, with the same technical effect achieved. To avoid repetition, details are not described herein again. The computer-readable storage medium includes, for example, a non-transitory computer-readable storage medium, such as a read-only memory (ROM), a random access memory (RAM), a magnetic disk, or an optical disc.

The aspects of the present invention are described above with reference to the flowcharts and/or block diagrams of the methods, apparatuses (systems), and computer program products according to the embodiments of the present invention. It should be understood that each block in the flowcharts and/or block diagrams, and a combination of blocks in the flowcharts and/or block diagrams may be implemented by using computer program instructions. These computer program instructions may be provided for a general-purpose computer, a special-purpose computer, or a processor of any other programmable data processing apparatus to generate a machine, so that the computer or the processor of any other programmable data processing apparatus can execute the instructions to implement functions or actions specified in one or more blocks in the flowcharts and/or block diagrams. The processor may be but is not limited to a general-purpose processor, a special-purpose processor, an application-specific processor, or a field programmable logic circuit. It may also be understood that each block in the block diagrams and/or the flowcharts and a combination of the blocks in the block diagrams and/or the flowcharts may also be implemented by dedicated hardware for executing a specified function or action or may be implemented by a combination of dedicated hardware and computer instructions.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings, but the present invention is not limited to the embodiments. The embodiments are only illustrative rather than restrictive. Inspired by the present invention, a person of ordinary skill in the art can still derive a plurality of variations without departing from the essence of the present invention and the protection scope of the claims. All these variations shall fall within the protection of the present invention.

What is claimed is:

1. A beam indication method, comprising:
receiving beam indication information transmitted by a network-side device, wherein the beam indication information is used to indicate a plurality of pieces of beam information of a channel or a reference signal, and the plurality of pieces of beam information correspond to different transmission and reception point TRP identification information; and
transmitting the channel or the reference signal according to the beam indication information;
wherein the reference signal comprises the CSI-RS; and before the transmitting the channel or the reference signal according to the beam indication information, the method further comprises:
if the CSI-RS is an aperiodic CSI-RS, and a scheduling offset between DCI and the aperiodic CSI-RS is less than or equal to a preset offset threshold, and there is another downlink signal on a symbol on which the CSI-RS is located, determining TCI state information of the CSI-RS based on TCI state information of the another downlink signal;
or,
wherein the reference signal comprises the SRS; and the beam indication information comprises:
a plurality of pieces of spatial relation information, wherein the plurality of pieces of spatial relation information correspond to different TRP identification information.

2. The method according to claim 1, wherein if the another downlink signal is a PDSCH, a mode of the DCI is a single-DCI mode; and
the determining TCI state information of the CSI-RS based on TCI state information of the another downlink signal comprises any one of the following:
determining that TCI state information of the PDSCH corresponding to same TRP identification information as the TCI state information of the CSI-RS is the TCI state information of the CSI-RS;
determining that TCI state information of the PDSCH corresponding to same TRP identification information as a source reference signal in the TCI state information of the CSI-RS is the TCI state information of the CSI-RS;
determining that TCI state information of the PDSCH corresponding to same TRP identification information as the PDCCH triggering the CSI-RS is the TCI state information of the CSI-RS; or
determining that default TCI state information in a group of TCI state information corresponding to preset TRP identification information is the TCI state information of the CSI-RS.

3. The method according to claim 2, wherein the default TCI state information comprises:
TCI state information having a preset TCI state identifier;
wherein the preset TRP identification information comprises:
TRP identification information corresponding to the PDSCH; or
TRP identification information corresponding to the PDCCH; or
TRP identification information corresponding to the TCI state information of the CSI-RS.

4. The method according to claim 1, wherein if the another downlink signal is a PDSCH, a mode of the DCI is a multi-DCI mode; and
the determining TCI state information of the CSI-RS based on TCI state information of the another downlink signal comprises:
determining the TCI state information of the CSI-RS based on TCI state information of the PDSCH corresponding to preset TRP identification information;
wherein the preset TRP identification information comprises:
TRP identification information corresponding to the PDSCH; or
TRP identification information corresponding to the PDCCH for scheduling the PDSCH; or
TRP identification information corresponding to the TCI state information of the CSI-RS.

5. The method according to claim 1, wherein if the another downlink signal is a periodic CSI-RS or a semi-persistent CSI-RS or another aperiodic CSI-RS with an effective TCI state,
the determining TCI state information of the CSI-RS based on TCI state information of the another downlink signal comprises:
if the CSI-RS corresponds to same TRP identification information as the another downlink signal, determining the TCI state information of the CSI-RS based on the TCI state information of the another downlink signal; or
if the CSI-RS and the another downlink signal correspond to different TRP identification information, determining the TCI state information of the CSI-RS based on the TCI state information of the another downlink signal or default TCI state information corresponding to same TRP identification information as the CSI-RS.

6. The method according to claim 1, wherein when the TCI state information is TCI state information of a CSI-RS on a fourth bandwidth part of a fourth component carrier indicated by the network-side device, the TCI state information is applied to all CSI-RSs corresponding to same TRP identification information as the CSI-RS, among all component carriers in a component carrier list in which the fourth component carrier is located; or the TCI state information is applied to a CSI-RS having a same CSI-RS resource index and corresponding to same TRP identification information as the CSI-RS, among all component carriers in a component carrier list in which the fourth component carrier is located.

7. The method according to claim 1, wherein when the spatial relation information is spatial relation information of an SRS on a fifth bandwidth part of a fifth component carrier and activated by a media access control control element, the spatial relation information is applied to all SRSs corresponding to same TRP identification information as the SRS, among all component carriers in a component carrier list in which the fifth component carrier is located; or the spatial relation information is applied to an SRS having a same SRS resource index and corresponding to same TRP identification information as the SRS, among all component carriers in a component carrier list in which the fifth component carrier is located.

8. The method according to claim 1, further comprising:
if the beam indication information does not comprise spatial relation information of the SRS, determining the spatial relation information of the SRS based on default TCI state information or quasi-co-location information corresponding to preset TRP identification information.

9. The method according to claim 8, wherein the default TCI state information or the quasi-co-location information comprises:
TCI state information or quasi-co-location information of a control resource set having a smallest control resource set identifier and corresponding to the preset TRP identification information; or
TCI state information having a smallest TCI state identifier in a group of activated TCI state information corresponding to the preset TRP identification information; or
TCI state information corresponding to a lowest codepoint in a TCI field of DCI; or
TCI state information corresponding to a lowest codepoint among codepoints containing one piece of TCI state information in a TCI field of DCI; or
TCI state information corresponding to a lowest codepoint among codepoints containing a plurality of pieces of TCI state information in a TCI field of DCI.

10. A terminal device, comprising a memory, a processor, and a computer program stored in the memory and capable of running on the processor, wherein
when the processor executes the computer program, the following steps are implemented:
receiving beam indication information transmitted by a network-side device, wherein the beam indication information is used to indicate a plurality of pieces of beam information of a channel or a reference signal, and the plurality of pieces of beam information correspond to different transmission and reception point TRP identification information; and
transmitting the channel or the reference signal according to the beam indication information;
wherein the reference signal comprises the CSI-RS; and before the transmitting the channel or the reference signal according to the beam indication information, the method further comprises:
if the CSI-RS is an aperiodic CSI-RS, and a scheduling offset between DCI and the aperiodic CSI-RS is less than or equal to a preset offset threshold, and there is another downlink signal on a symbol on which the CSI-RS is located, determining TCI state information of the CSI-RS based on TCI state information of the another downlink signal;
or,
wherein the reference signal comprises the SRS; and the beam indication information comprises:
a plurality of pieces of spatial relation information, wherein the plurality of pieces of spatial relation information correspond to different TRP identification information.

11. The terminal device according to claim 10, wherein if the another downlink signal is a PDSCH, a mode of the DCI is a single-DCI mode; and
the determining TCI state information of the CSI-RS based on TCI state information of the another downlink signal comprises any one of the following:
determining that TCI state information of the PDSCH corresponding to same TRP identification information as the TCI state information of the CSI-RS is the TCI state information of the CSI-RS;
determining that TCI state information of the PDSCH corresponding to same TRP identification information as a source reference signal in the TCI state information of the CSI-RS is the TCI state information of the CSI-RS;
determining that TCI state information of the PDSCH corresponding to same TRP identification information as the PDCCH triggering the CSI-RS is the TCI state information of the CSI-RS; or
determining that default TCI state information in a group of TCI state information corresponding to preset TRP identification information is the TCI state information of the CSI-RS.

12. The terminal device according to claim 11, wherein the default TCI state information comprises:
TCI state information having a preset TCI state identifier;
wherein the preset TRP identification information comprises:
TRP identification information corresponding to the PDSCH; or
TRP identification information corresponding to the PDCCH; or
TRP identification information corresponding to the TCI state information of the CSI-RS.

13. The terminal device according to claim 10, further comprising:
if the beam indication information does not comprise spatial relation information of the SRS, determining the spatial relation information of the SRS based on default TCI state information or quasi-co-location information corresponding to preset TRP identification information.

14. The terminal device according to claim 13, wherein the default TCI state information or the quasi-co-location information comprises:
TCI state information or quasi-co-location information of a control resource set having a smallest control resource set identifier and corresponding to the preset TRP identification information; or
TCI state information having a smallest TCI state identifier in a group of activated TCI state information corresponding to the preset TRP identification information; or
TCI state information corresponding to a lowest codepoint in a TCI field of DCI; or
TCI state information corresponding to a lowest codepoint among codepoints containing one piece of TCI state information in a TCI field of DCI; or
TCI state information corresponding to a lowest codepoint among codepoints containing a plurality of pieces of TCI state information in a TCI field of DCI.

15. The method according to claim 10, wherein if the another downlink signal is a PDSCH, a mode of the DCI is a multi-DCI mode; and
the determining TCI state information of the CSI-RS based on TCI state information of the another downlink signal comprises:

determining the TCI state information of the CSI-RS based on TCI state information of the PDSCH corresponding to preset TRP identification information;

wherein the preset TRP identification information comprises:

TRP identification information corresponding to the PDSCH; or

TRP identification information corresponding to the PDCCH for scheduling the PDSCH; or TRP identification information corresponding to the TCI state information of the CSI-RS.

16. A network-side device, comprising a memory, a processor, and a computer program stored in the memory and capable of running on the processor, wherein when the processor executes the computer program, the following steps are implemented:

transmitting beam indication information to a terminal device, so that the terminal device transmits a channel or a reference signal according to the beam indication information, wherein the beam indication information is used to indicate a plurality of pieces of beam information of the channel or the reference signal, and the plurality of pieces of beam information correspond to different TRP identification information;

wherein the reference signal comprises the CSI-RS;

if the CSI-RS is an aperiodic CSI-RS, and a scheduling offset between DCI and the aperiodic CSI-RS is less than or equal to a preset offset threshold, and there is another downlink signal on a symbol on which the CSI-RS is located, TCI state information of the CSI-RS is determined based on TCI state information of the another downlink signal;

or, wherein the reference signal comprises the SRS; and the beam indication information comprises:

a plurality of pieces of spatial relation information, wherein the plurality of pieces of spatial relation information correspond to different TRP identification information.

17. The network-side device according to claim 16, wherein if another downlink signal is a PDSCH, a mode of the DCI is a single-DCI mode; and the determining TCI state information of the CSI-RS based on TCI state information of the another downlink signal comprises any one of the following:

determining that TCI state information of the PDSCH corresponding to same TRP identification information as the TCI state information of the CSI-RS is the TCI state information of the CSI-RS;

determining that TCI state information of the PDSCH corresponding to same TRP identification information as a source reference signal in the TCI state information of the CSI-RS is the TCI state information of the CSI-RS;

determining that TCI state information of the PDSCH corresponding to same TRP identification information as the PDCCH triggering the CSI-RS is the TCI state information of the CSI-RS; or determining that default TCI state information in a group of TCI state information corresponding to preset TRP identification information is the TCI state information of the CSI-RS.

18. The network-side device according to claim 17, wherein the default TCI state information comprises:

TCI state information having a preset TCI state identifier;

wherein the preset TRP identification information comprises:

TRP identification information corresponding to the PDSCH; or

TRP identification information corresponding to the PDCCH; or

TRP identification information corresponding to the TCI state information of the CSI-RS.

19. The network-side device according to claim 16, further comprising: if the beam indication information does not comprise spatial relation information of the SRS, the spatial relation information of the SRS is determined based on default TCI state information or quasi-co-location information corresponding to preset TRP identification information.

20. The network-side device according to claim 19, wherein the default TCI state information or the quasi-co-location information comprises:

TCI state information or quasi-co-location information of a control resource set having a smallest control resource set identifier and corresponding to the preset TRP identification information; or TCI state information having a smallest TCI state identifier in a group of activated TCI state information corresponding to the preset TRP identification information; or TCI state information corresponding to a lowest codepoint in a TCI field of DCI; or TCI state information corresponding to a lowest codepoint among codepoints containing one piece of TCI state information in a TCI field of DCI; or TCI state information corresponding to a lowest codepoint among codepoints containing a plurality of pieces of TCI state information in a TCI field of DCI.

* * * * *